United States Patent
Brinzer

[11] Patent Number: 6,031,453
[45] Date of Patent: *Feb. 29, 2000

[54] MONITORING METHOD AND OBSERVATION SYSTEM FOR MONITORING AN AUTOMATION SYSTEM AND A TECHNICAL PROCESS

[75] Inventor: Peter Brinzer, Neunkirchen/Brand, Germany

[73] Assignee: Siemens Aktiengesellschaft, München, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/040,053

[22] Filed: Mar. 30, 1993

[30]  Foreign Application Priority Data

Mar. 30, 1992 [DE] Germany .......................... P42 10 420

[51] Int. Cl.[7] .................................................. G08B 25/00
[52] U.S. Cl. ........................ 340/525; 340/500; 340/517; 340/825.06; 700/83
[58] Field of Search .................................. 340/525, 500, 340/517, 691, 825.06, 691.1, 691.6; 364/146, 188; 700/9–12, 17, 83

[56] References Cited

U.S. PATENT DOCUMENTS

| | | | |
|---|---|---|---|
| 4,588,987 | 5/1986 | Stephens | 340/525 |
| 4,816,208 | 3/1989 | Woods et al. | 340/525 |
| 4,924,398 | 5/1990 | Fujiwara | 364/431.11 |
| 5,189,394 | 2/1993 | Walter et al. | 340/525 |
| 5,297,252 | 3/1994 | Becker | 340/525 |
| 5,327,117 | 7/1994 | Kohsaka | 340/525 |

FOREIGN PATENT DOCUMENTS

| | | |
|---|---|---|
| 32 24 586 | 1/1984 | Germany . |
| 36 08 219 | 11/1986 | Germany . |
| 37 23 834 | 1/1988 | Germany . |
| 38 12 618 | 11/1988 | Germany . |
| 39 10 718 | 10/1990 | Germany . |

OTHER PUBLICATIONS

Strohrmann, Günther: Process leittechnik. In: Automatisierungstechnische Praxis atp 32,1–1990, No. 10, pp. S17–S20.

Veenstra, Henderik; Westerholt, Harald: Leittechnik für Schaltanlagen LSA678, Anforderungen, Realisierung, praktischer Einsatz. In: Elektrizitätswirtschaft, Jg 87,1–1988, H.8, pp. 424–429.

Müller, Leo: Prozess leitsystem Überwachung auf einen Blick. In: Industrie–elektrik & elektronik, 31. Jg.1–1986, No. 10, pp. 12–13.

Crombach, Ulrich; Herwig, Rainer: Bedieneroberfläche zur Produktionsleitung und Fehlerdiagnose. In: etz vol. 110, 1–1989, No. 20, pp. 1076–1078.

Küchler, M.: "Kriterienanzeige" mit speicherprogrammierbarer Technik zum Einsatz in Kraftwerken. In: Automatisierungstechnische Praxis atp., 27 Jg. No. 12, 1985, pp. 594–597.

Litz, L.: Interkama 89: Prozessleitsysteme—Stand der Technik und Trends. In: Automatisierungstechnische Praxis atp 32,1–1990, No. 4, pp. 168–183.

Müller, Wolfgang: Leittechnik in Industrieanlagen, Elektronik, 22, Nov. 4, 1983, pp. 123–127.

Proceedings 1987 Carnahan Conference on Security Technology: Electronic Crime Countermeasures, J. C. Smart, Jul. 1987.

*Primary Examiner*—Donnie L. Crosland
*Attorney, Agent, or Firm*—Kenyon & Kenyon

[57] ABSTRACT

When a technical process is monitored, messages from an automation system are continually transmitted to an operating and observation system. The messages are evaluated in the operating and observation system and displayed on a monitor. When a fault is recognized in the automation system, the location of the fault is displayed in a type of hierarchical progression. For this purpose, at least the important planning and design data of the automation system are accessible from the operating and observation system.

20 Claims, 6 Drawing Sheets

MONITORING METHOD AND OBSERVATION SYSTEM FOR MONITORING AN AUTOMATION SYSTEM AND A TECHNICAL PROCESS

BACKGROUND OF THE INVENTION

The present invention relates to a monitoring method for a technical process and the automation system monitoring and controlling the technical process. The automation system transmits messages to an observation system, which is higher ranking than the automation system. From this observation system, messages are evaluated, and the results of the evaluation are displayed by a display unit which preferably includes graphics capability. The present invention also relates to an observation system for implementing the method.

Normally, such monitoring methods entail displaying a graphic diagram of the installation or of the process on a video screen. In particular, the observation system also handles the displaying and documenting of messages. When a fault such as a wire breakage in a peripheral adapter is recognized in the automation system, the fault is usually graphically displayed by showing its consequences. That is, the part of the system where the fault has occurred is marked by a predetermined color or indicated by a flashing on the screen. In addition, a message text indicator code is normally output on the video screen. This message text is also printed out on a printer as an error list.

It is also known to graphically display the side in the circuit diagram in which the electrical error has occurred on the video screen. However, no kind of comprehensive help exists for locating and isolating the fault. Often, it is not apparent from the circuit diagram at which geographical location of the automation system the fault has occurred. Also, there is no graphic support with respect to localizing the error within the circuit diagram.

SUMMARY OF THE INVENTION

The present invention supports the user of the automation system in his of her efforts to troubleshoot and localize the fault. In particular, when the error evaluation is complete, the user should know exactly at or in which module and at which location the fault has occurred.

A monitoring method according to the present invention:

allows the important planning and design data (preferably the entire planning and design data of the automation system) to be accessible from the observation system; and allows the location of a fault such as a defective module or a wire breakage in the peripheral circuit elements to be displayed in a type of hierarchical progression when the fault is detected in the automation system.

When the monitoring method includes several process displays, it is advantageous to be able to start the hierarchically graduated display of a fault location from each process display. In this case, one does not have to refer back to the entire display of the process or of the installation when a fault has occurred somewhere in the process or in the system.

When the location of a fault is depicted in a graphics display, the user is able to detect the fault location very easily and quickly.

When the display steps include displays of the geographical location as well as displays of the circuit location of the fault, the user receives information about the location where the fault has occurred, as well as information about the type of fault that has occurred.

When the automation system is arranged in control cabinets, whereby each control cabinet has at least one subrack with electronic modules, it is advantageous:

for the design of the control cabinet to be initially displayed when the fault location is displayed, whereby the module in which the fault has occurred is specially set off or emphasized in some manner;

to display the subrack including the module where the fault occurred, whereby the module is emphasized in some manner; and in some instances, to display the circuit diagram of the module including the peripheral circuit elements in which the fault has occurred, whereby the circuit in which the fault occurred is emphasized.

BRIEF DESCRIPTION OF THE DRAWINGS

Further advantages and details of the present invention will become apparent in view of the following description of an exemplified embodiment in conjunction with the attached drawings.

DETAILED DESCRIPTION

Figure 1:
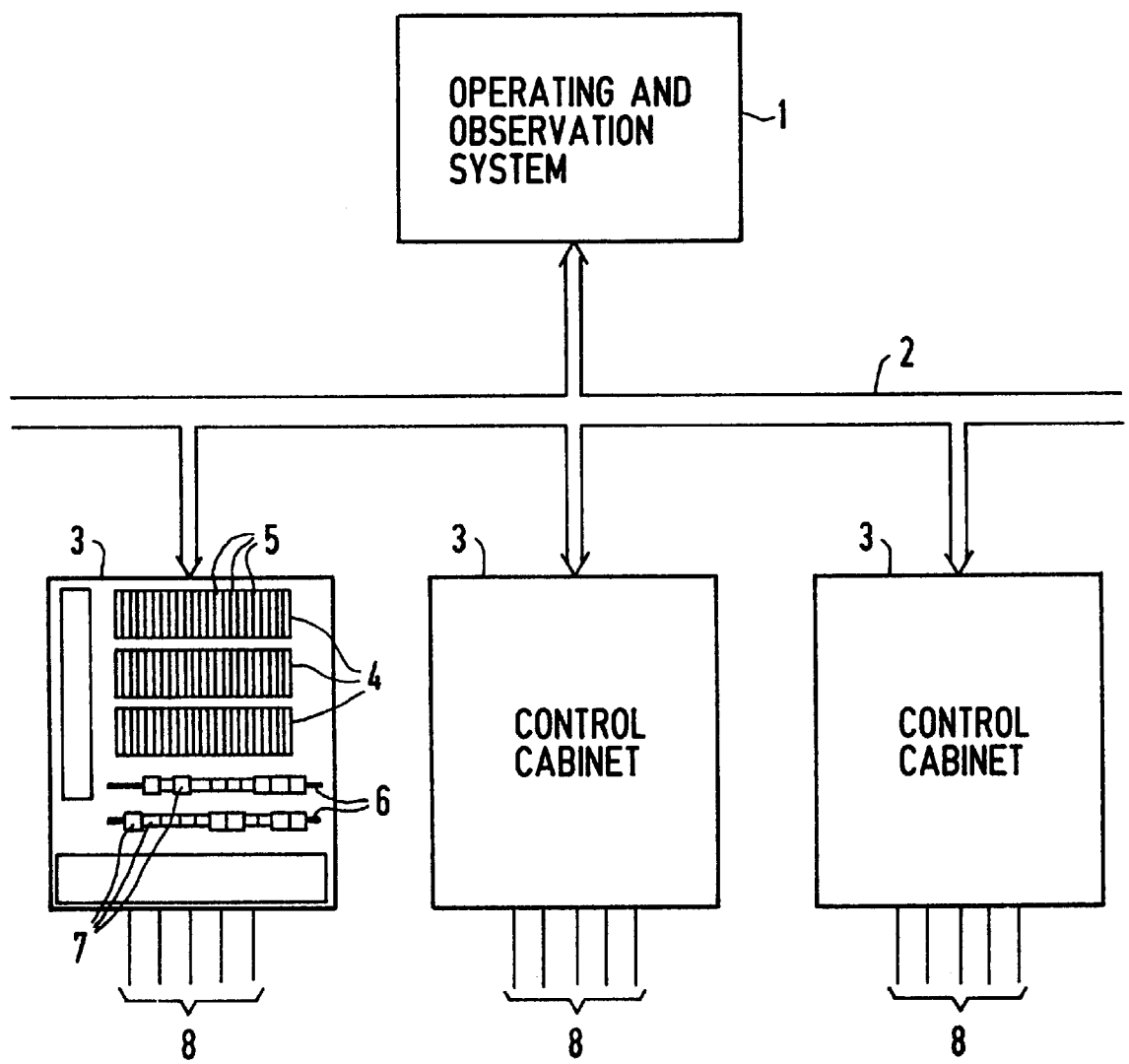
FIG. 1 illustrates a basic representation of an automation system according to an embodiment of the present invention.

FIG. 1 illustrates an automation system including an operating and observation system 1 to which the other components of the automation system are linked via a bus 2. The components are typically arranged in control cabinets 3. Several subracks 4 having modules 5 and several rows 6 of electrical components 7 are situated in control cabinets 3. Only one of the control cabinets 3 is depicted in detail in FIG. 1. The other control cabinets 3 are only depicted schematically for the sake of clarity. Several lines 8 run from the control cabinets 3 to the controlled process.

Figure 2:
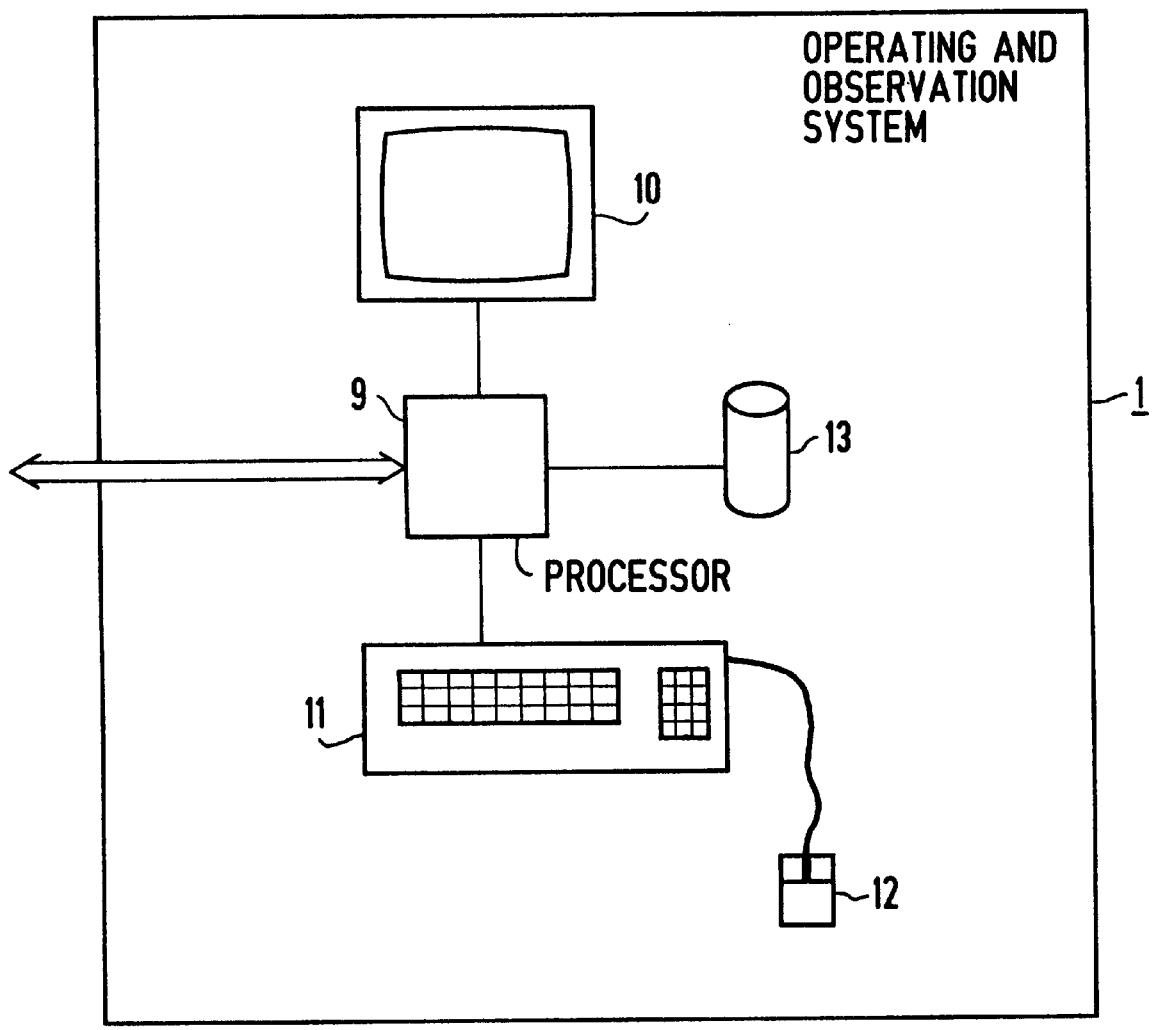
FIG. 2 illustrates a basic representation of an operating and observation system according to an embodiment of the present invention.

As illustrated in FIG. 2, the operating and observation system 1 includes a processor 9 which evaluates messages transmitted by the remainder of the automation system. A graphics monitor 10 and a terminal 11 are linked to the processor 9. A mouse 12 is also linked to processor 9 via the terminal 11. Furthermore, a data storage unit 13 is linked to the processor 9. The entire planning and design data pertaining to the automation system are stored in data storage unit 13. Alternatively, only important planning and design data may be stored in data storage unit 13. The planning and design data include, among other things, all of the circuit diagrams of the installation and the configuration plans of all the installation systems, such as the subrack 4 and the cabinets 3, together with all identification data and parameters.

In the normal operation of the automation system, a graphic representation of the installation, a graphic representation of a section of the installation, and a graphic representation of the process or a graphic representation of part of the process are displayed on the monitor 10. The image of the installation or of the process that is displayed is continually updated on the basis of operator controls or messages transmitted by the automation system to the operating and observation system 1.

Figure 3:
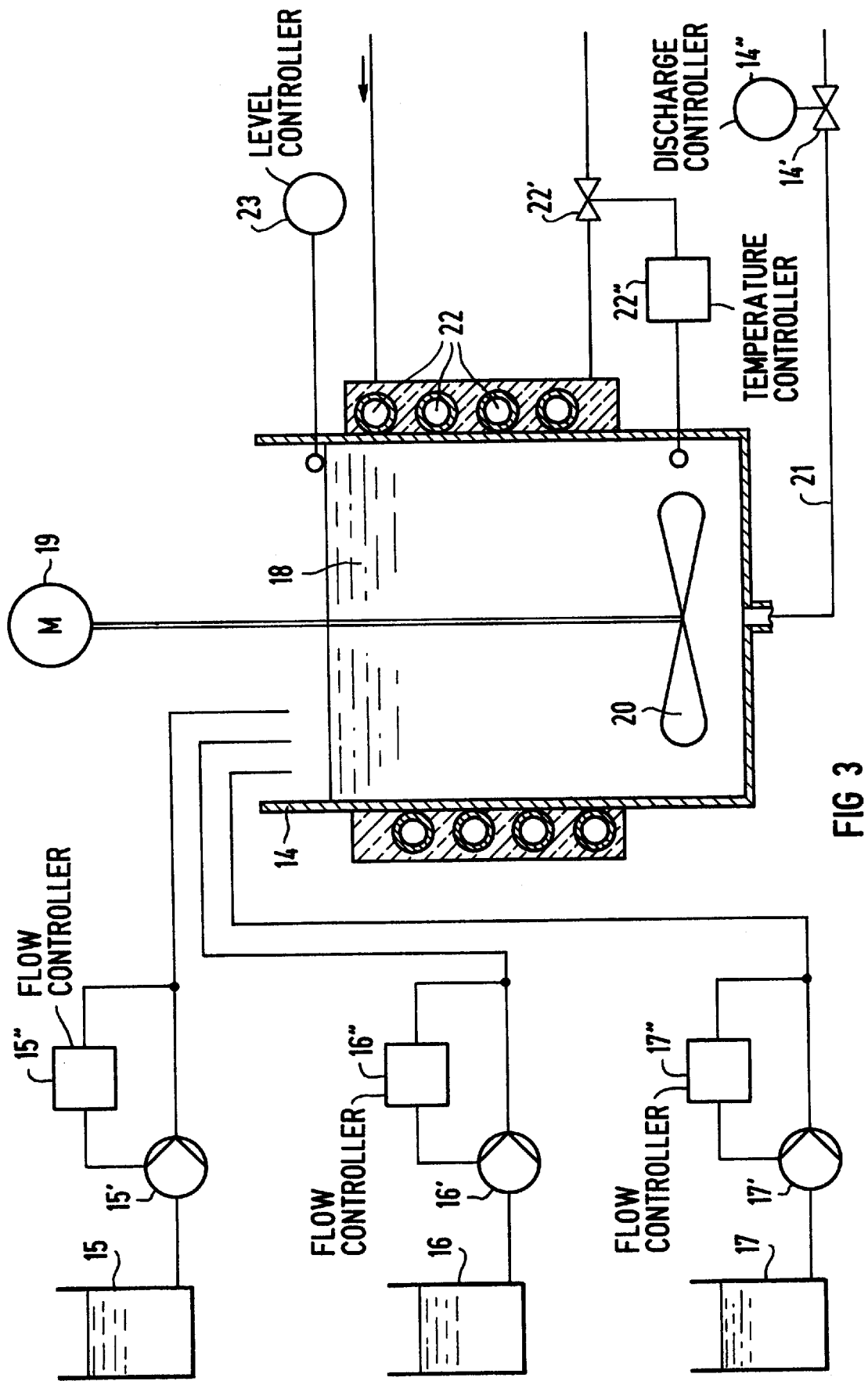
FIG. 3 illustrates an exemplary representation of an installation.

FIG. 3 illustrates a representation of the installation to be controlled, as displayed on the monitor 10. A reactor 14 is loaded by supply tanks 15, 16 and 17 via pumps 15', 16' and 17', respectively. The pumps 15', 16' and 17' are regulated by flow controllers 151", 161" and 171", respectively. In the reactor 14, the reactor mixture 18 is mixed by an agitator 20 that is driven by a motor 19. The reactor mixture 18 flows off through valve 14' via line 21. Valve 14' is controlled by discharge controller 14". Furthermore, the graphic display according to FIG. 3 also depicts a temperature controller 22" which regulates the supply of hot water to heating coils 22 by way of a valve 22' so that a predetermined temperature range is adhered to in the reactor mixture 18. A level controller 23 is also illustrated in the display according to FIG. 3. This level controller 23 acts as a master controller to specify setpoint values to the flow controllers 15", 16" and 17' and to the discharge controller 14".

Figure 4:
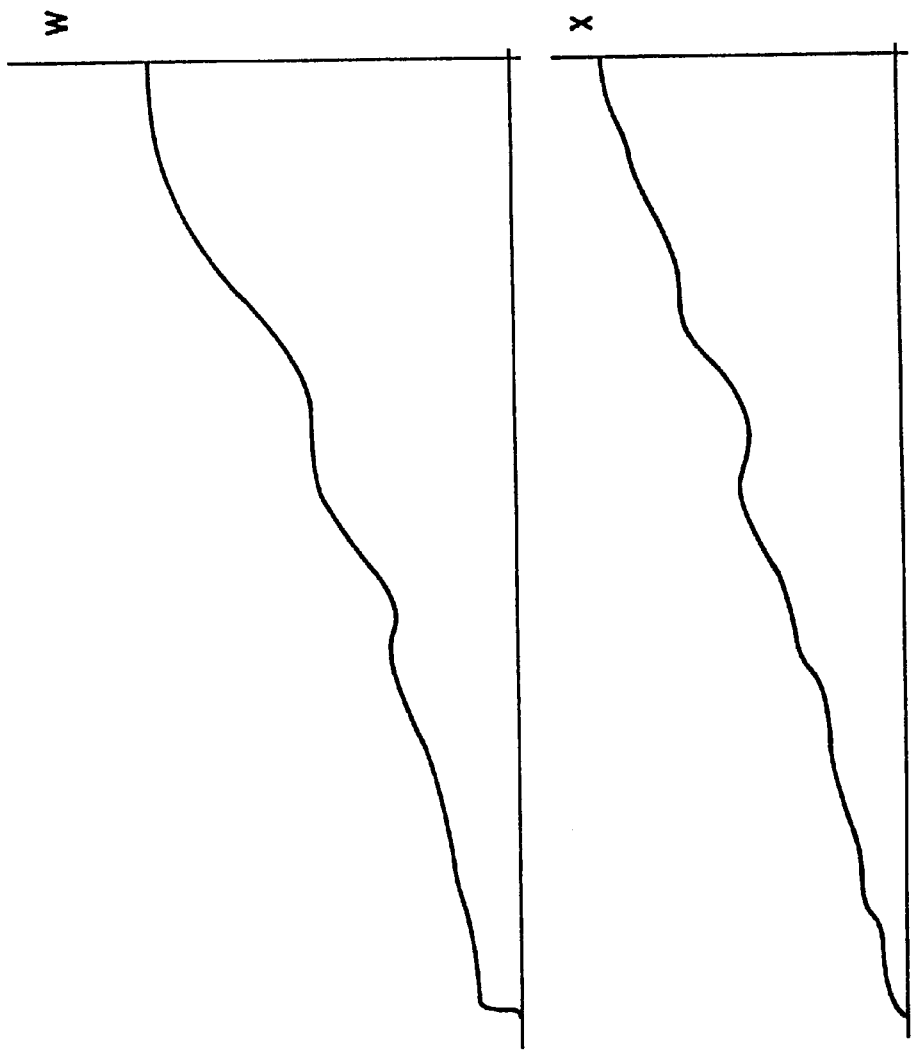
FIG. 4 illustrates an exemplary depiction of a control loop.

A representation according to FIG. 3, which can be a complete representation of the entire installation or also of only a partial section as displayed on the monitor 10 of the control system 1, is quite typical of automated processes. A display as shown in FIG. 4 is also quite common. Here, for example, the time characteristic of the setpoint value w and the actual value x of one of the control loops of the reactor 14 are depicted. Furthermore, in accordance with FIG. 4, the control-loop parameters are also displayed on the video screen in a control room (or operating and observation system 1).

If a control system fault were to occur in the monitored installation or in the monitored process, then an appropriate message would be sent to the operating and observation system 1. Any fault in the automation system would be considered as a control system fault, such as a wire breakage in one of the lines 8. The message transmitted to the operating and observation system 1 includes at least the following information:

a code for the type of fault that has occurred;

a code for the location of the fault; and the time of the fault.

The location of the fault can be given implicitly, for example, by transmitting the address of the programmable controller as well as the address of the module 5' in which the fault has occurred or by transmitting the identification of the electrical component 7' (for example, of an automatic circuit breaker) in which the fault has occurred. Initially, the address or the identification relates only logically and not physically to the actual location (i.e., the module slot). The actual fault location cannot be determined until the address or the identification is compared to the planning and design data. The time that the fault occurred can either be determined by the operating and observation system 1 or may be transmitted along with the other information.

The fault is superimposed on the image that is displayed at the moment immediately after it is reported. This occurs independently of whether the image displayed at the moment shows the entire process, the complete installation, or only parts of them, and is shown schematically for a detected wire breakage in FIG. 4.

When the user of the installation does not want to ignore the error message, but would like to precisely locate the error, he or she inputs an appropriate command at terminal 11 to have a closer look at the geographical and circuit location of the fault.

This input can be the "control-S" command, for example. When a mouse 12 is available to the user, he or she can easily call up a view of the fault. In this case, the user merely clicks with the mouse 12 on field 24, which displays a special message. When the user calls up the fault display function, the next thing that comes up is a display of the control cabinet 3 in which the fault has occurred. This display is shown in FIG. 5.

To display the fault on the monitor 10, the processor 9 retrieves the planning and design data of the automation system from the data storage unit 13 for planning and design. On the basis of this planning and design data, the processor 9 determines the control cabinet 3 in which the fault has occurred, as well as its geometric structure. According to FIG. 5, this structure is displayed on the monitor 10 when the fault-display program is called up. In addition, the number and possibly also the location of the control cabinet 3 are indicated in the display field 25.

Figure 5:
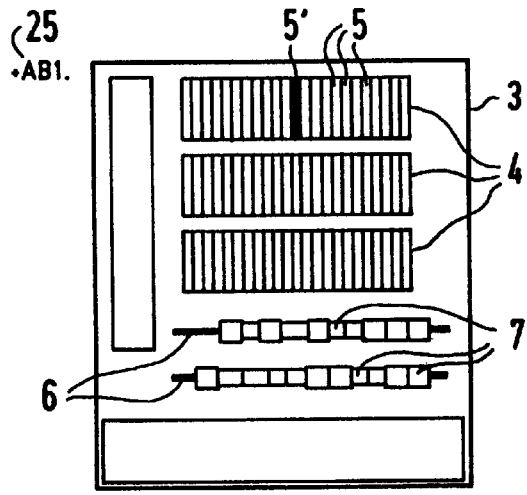
FIG. 5 illustrates a control cabinet.

In the present case illustrated in FIG. 5, it is assumed that the fault has occurred in the peripheral circuit elements of the module 5' of the uppermost subrack 4. This module 5' is, therefore, set off optically (i.e., it is indicated by a color marking, as shown in FIG. 5, or by a flashing on the screen).

Figure 6:
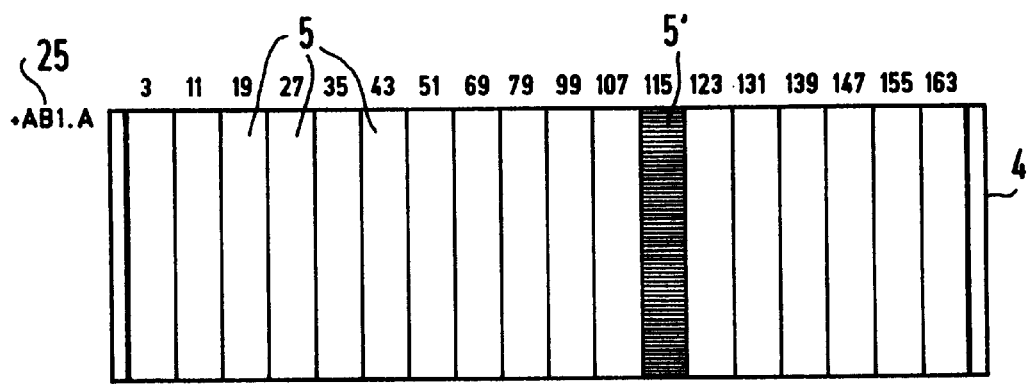
FIG. 6 illustrates a subrack having modules.

When the user of the installation would like to view the fault more closely, he can again input a command, such as "control-N", or click with the mouse 12 on the uppermost subrack 4. A display of this subrack 4 then comes up, as illustrated in FIG. 6. This representation is also determined by the processor 9 on the basis of the planning and design data.

According to FIG. 6, the number of the control cabinet 3 and that of the subrack 4 being displayed are now entered in the display field 25 on the monitor 10. The subrack 4 is displayed, as shown in FIG. 5. Here, as well, the modules 5 are again displayed, whereby the defective module 5' is set off optically. In this display, the geographic location of the fault, namely the module 5', is sufficiently localized. When the module 5' itself is defective, the display according to FIG. 6 is a final display. On the other hand, if there are wire breakages, besides the geographic location, the circuit location of the fault can also be reported to the user.

Figure 7:
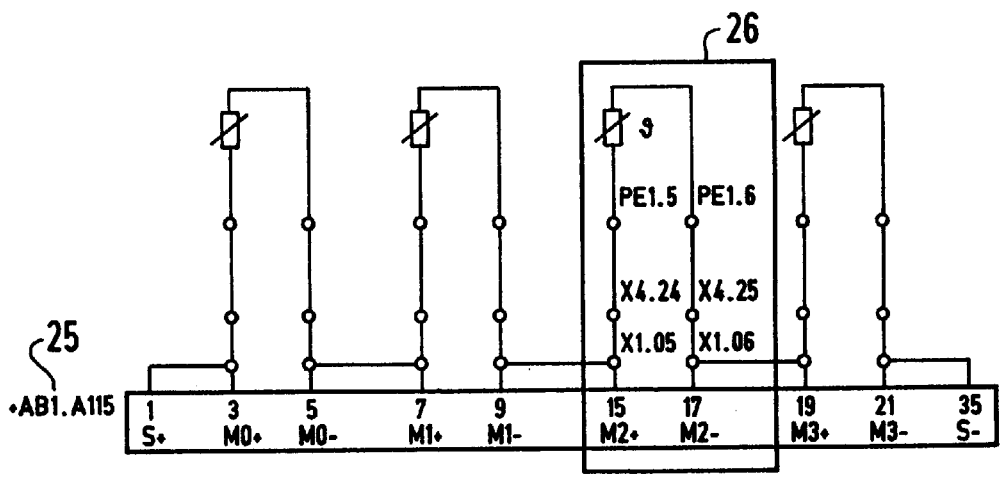
FIG. 7 illustrates a section of the circuit diagram of the peripheral circuit elements of one module.

In case of a wire breakage, to additionally determine the circuit location of the fault, the user clicks with the mouse 12 on module 5' on the monitor 10 and the display comes up as shown in FIG. 7, which depicts the section of the circuit diagram in which the fault has occurred. The circuit diagram was also determined by the processor 9 on the basis of the planning and design data from the data storage unit 13 for planning and design. The numbers of the control cabinet 3, the subrack 4, the module 5', and the side of the circuit diagram are indicated thereby in the display field 25. In the same way, the circuit diagram of this side is shown on the monitor 10.

The location, this time the circuit location of the fault, is again set off optically (i.e., it is indicated by outline 26 flashing on the screen). In addition, a message about the type of fault can also be indicated on the monitor 10.

To be able to display the fault, the geographic location of the fault, and the circuit location of the fault, it does not suffice, of course, that the complete planning and design data are retrievable by a computer from the control room 1 (or operating and observation system 1). The planning and design data of the automation system must also be up-to-date, since otherwise meaningless error messages would occur.

Furthermore, the fault recognition in the automation system must follow precisely to such an extent that each fault is able to be exactly localized. Thus, it does not suffice to merely recognize a fault, but rather at least the fault code and the address or the identification of the component in which the fault has occurred must be transmitted.

Figure 8:
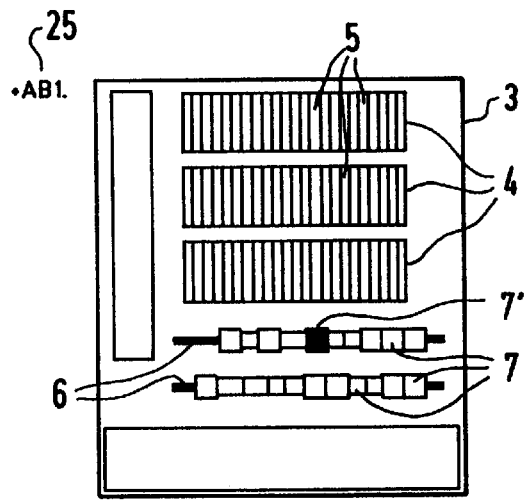
FIG. 8 illustrates a control cabinet.

FIG. 8 illustrates the display of the entire control cabinet 3 in which a fault in the electrical component 7' was detected. When the electrical component 7' itself cannot transmit any message to the operating and observation system 1, this must be done indirectly via a programmable controller, which then relays this fault to the operating and observation system 1. To this end, a signal which is released by the electrical component 7' in case of a fault is used as an input signal for a programmable controller, whereby the programmable controller is programmed to respond to the application of a fault signal by reporting this fault to the operating and observation system 1.

Figure 9:
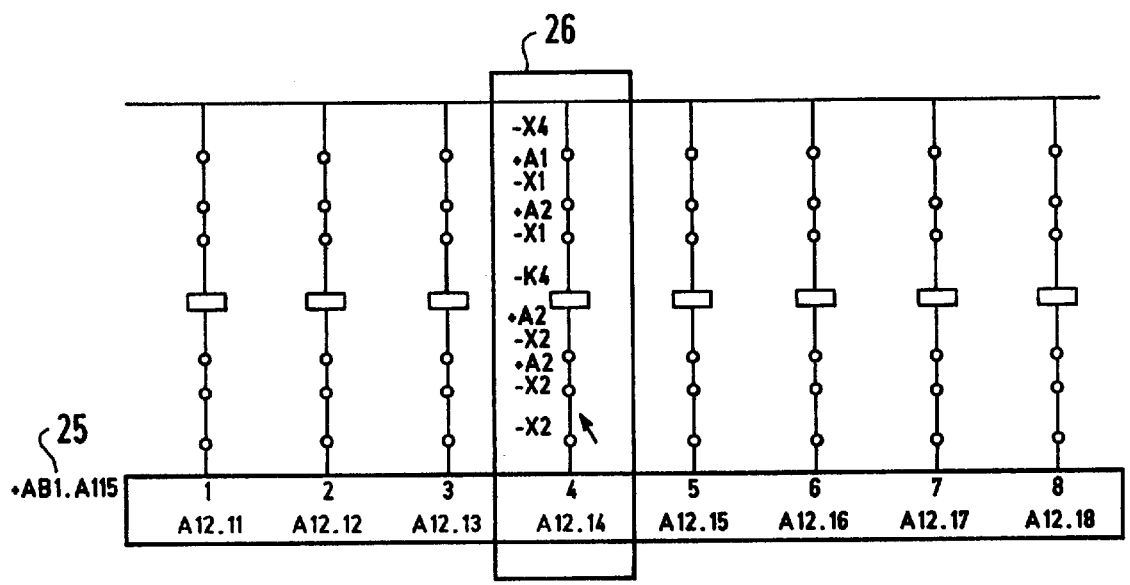
FIG. 9 illustrates a section of the circuit diagram of the peripheral circuit elements of one electric component.

This fault is also displayed on the monitor 10 after the planning and design data are retrieved by the processor 9. The fault of the defective electrical component 7' is optically set off in a manner similar to the defective module 5' illustrated in FIG. 5. The geographic location of the fault is thus sufficiently localized. After clicking the mouse 12 on the defective electrical component 7' the part of the circuit diagram of this electrical component 7' in which the fault has occurred is again displayed on the monitor 10 as illustrated in FIG. 9. The fault is again optically highlighted, for example, by a flashing outline 26.

The above-described exemplified embodiment only illustrates how electrical faults are detected and displayed. When the planning and design data also include the programs for the individual components of the automation system, it is, of course, also possible to detect and display program faults (such as when the limiting value of a software controller is exceeded or when there is an overrun time-out at one operational level).

In conclusion, it is established that the fault localization and the fault diagnosis are considerably facilitated from the control room (or operating and observation system 1) by means of the above-described monitoring method. To implement the method, besides a graphics monitor, which is usually already present in control rooms, a data storage unit such as a hard disk is also needed on which the complete, up-to-date planning and design data are stored and from which this data can be retrieved on-line from the control room computer. The present invention is capable of rapidly localizing the fault location from the control room. Moreover, the present invention eliminates the need for cumbersome searches in circuit books of paper.

Additionally, it is not merely possible for the monitoring method to be carried out in the control room, but in principle also from every computer which has a graphics monitor and access to the planning and design data. It is conceivable, for example, to interconnect the control cabinets 3 via a local area network (LAN) and to provide for ways to interface a graphics programming unit to the local area network. When the planning and design data are then available to the programming unit, for example by diskette, the method can also be implemented, of course, by means of the programming unit.

What is claimed is:

1. A method for monitoring an automation system and a technical process monitored and controlled by the automation system, the automation system being arranged in control cabinets, each of the control cabinets including at least one subrack which has modules, the method comprising steps of:

transmitting a message from the automation system to an observation system when a fault in the automation system occurs at a location;

accessing important planning and design data of the automation system, said planning and design data comprising at least information about locations related to all possible codes transmitted by the automation system;

determining the location of the fault in the automation system by comparing a code of said transmitted message with the accessed planning and design data; and displaying a result of the determination on a display unit, wherein the displaying step includes the substeps of:

a) displaying a representation of one of the control cabinets in which the fault occurred, a representation of one of the at least one modules of the one of the control cabinets being visually emphasized in the display, the fault being associated with the one of the modules, b) displaying a representation of one of the at least one subracks in which the fault occurred, the representation of the one of the modules being visually emphasized in the display, and c) displaying a circuit diagram of the one of the modules.

2. A method for monitoring an automation system and a technical process according to claim 1, wherein said detected fault is a defective module or a wire breakage in peripheral circuit elements.

3. A method for monitoring an automation system and a technical process according to claim 1, wherein said observation system is an operating and observation system which has a rank higher than a rank of the automation system.

4. A method for monitoring an automation system and a technical process according to claim 1, wherein said display unit includes graphics capability.

5. A method for monitoring an automation system and a technical process according to claim 1, wherein said accessing step accesses all planning and design data of the automation system.

6. A method for monitoring an automation system and a technical process according to claim 1, wherein the monitoring method includes displaying several processes, and hierarchically graduated display of a fault location may be started from each process display.

7. A method for monitoring an automation system and a technical process according to claim 1, wherein the location of a fault is depicted in a graphics display.

8. A method for monitoring an automation system and a technical process according to claim 1, wherein the displaying step includes displaying a geographical location as well as displaying a circuit location of the detected fault.

9. A method monitoring the automation system and the technical process according to claim 1, wherein the displaying step includes the substep of:

d) displaying a peripheral circuit of the circuit diagram, and wherein the fault is associated with a particular circuit of the peripheral circuit, the particular circuit being emphasized in the display.

10. A method for monitoring an automation system and a technical process according to claim 1, wherein said monitoring method detects and displays electrical faults and program faults.

11. An observation system for monitoring an automation system and a technical process monitored and controlled by the automation system, the automation system being arranged in control cabinets, the control cabinets including at least one subrack which has modules, said observation system comprising:

a data storage unit which stores important planning and design data of the automation system, said planning and design data comprising at least information about locations related to codes transmitted by the automation system;

a processor which accesses said data storage unit and which evaluates messages transmitted by the automation system by comparing a code of said messages indicating a location of a fault in the automation system with the stored planning and design data of the automation system; and a display unit which displays the results of the evaluation by:
 a) displaying a representation of one of the control cabinets in which the fault occurred, a representation of one of the at least one modules of the one of the control cabinets being visually emphasized in the display, the fault being associated with the one of the modules,
 b) displaying a representation of one of the at least one subracks in which the fault occurred, the representation of the one of the modules being visually emphasized in the display, and
 c) displaying a circuit diagram of the one of the modules, wherein said data storage unit and said display unit are coupled to said processor.

12. An observation system according to claim 11, wherein said fault is a defective module or a wire breakage in peripheral circuit elements.

13. An observation system according to claim 11, wherein said observation system is an operating and observation system which has a rank higher than a rank of the automation system.

14. An observation system according to claim 11, wherein said display unit includes graphics capability.

15. An observation system according to claim 11, wherein said data storage unit stores all planning and design data of the automation system.

16. An observation system according to claim 11, wherein said display unit displays several processes, and hierarchically graduated display of a fault location may be started from each process display.

17. An observation system according to claim 11, wherein the location of a fault is depicted in a graphics display.

18. An observation system according to claim 11, wherein said display unit displays the geographical location as well as the circuit location of the fault.

19. An observation system according to claim 11, wherein, after the one of the cabinets is displayed, a peripheral circuit of the circuit diagram is displayed, and wherein the fault is associated with a particular circuit of the peripheral circuit, the particular circuit being emphasized in the display.

20. An observation system according to claim 11, wherein said observation system detects and displays electrical faults and program faults.

* * * * *